US012643990B2

(12) United States Patent
Wang et al.

(10) Patent No.: US 12,643,990 B2
(45) Date of Patent: Jun. 2, 2026

(54) POLYPROPYLENE COMPOSITION CONTAINING A NEW CHARGE-STABILIZING AGENT FOR ELECTRET MELT BLOWN WEBS

(71) Applicant: BOREALIS AG, Vienna (AT)

(72) Inventors: Jingbo Wang, Linz (AT); Markus Gahleitner, Linz (AT); Klaus Bernreitner, Linz (AT); Joachim Fiebig, Linz (AT); Henk Van Paridon, Beringen (BE); Wilhelmus Sars, Geleen (NL); Gustaf Tobieson, Stenungsund (SE); Pauli Leskinen, Porvoo (FI)

(73) Assignee: BOREALIS AG, Vienna (AT)

( * ) Notice: Subject to any disclaimer, the term of this patent is extended or adjusted under 35 U.S.C. 154(b) by 289 days.

(21) Appl. No.: 18/260,504

(22) PCT Filed: Jan. 21, 2022

(86) PCT No.: PCT/EP2022/051357
§ 371 (c)(1),
(2) Date: Jul. 6, 2023

(87) PCT Pub. No.: WO2022/157318
PCT Pub. Date: Jul. 28, 2022

(65) Prior Publication Data

US 2024/0084103 A1 Mar. 14, 2024

(30) Foreign Application Priority Data

Jan. 21, 2021 (EP) .................................... 21152814

(51) Int. Cl.
*B01D 39/16* (2006.01)
*C08K 5/3435* (2006.01)
(Continued)

(52) U.S. Cl.
CPC ........ *C08K 5/3435* (2013.01); *B01D 39/1623* (2013.01); *D01F 1/10* (2013.01);
(Continued)

(58) Field of Classification Search
None
See application file for complete search history.

(56) References Cited

U.S. PATENT DOCUMENTS 6,537,670 B1 * 3/2003 Sassi ...................... C09K 15/08 428/419
9,815,068 B2 * 11/2017 Schultz .................. C08K 5/378
(Continued)

FOREIGN PATENT DOCUMENTS

CN 101405306 B 4/2009
CN 110105667 A 8/2019
(Continued)

OTHER PUBLICATIONS

Gurmeet Singh, et al., "Triad sequence determination of ethylene-propylene copolymers—application of quantitative 13C NMR" Polymer Testing 28 (2009) 475-479.
(Continued)

*Primary Examiner* — Gabriel E Gitman
(74) *Attorney, Agent, or Firm* — Tarolli, Sundheim, Covell & Tummino LLP

(57) ABSTRACT

A polypropylene composition (PC) comprising: a. from 95.0 to 99.99 wt.-%, of a polypropylene (PP), preferably a propylene homopolymer (HPP); and b. from 0.01 to 5.0 wt.-%, of a compound according to Formula (I), wherein each R is independently selected from $C_1$ to $C_6$ alkylene, $C_2$ to $C_6$ alkenylene and a single bond, each R' is independently selected from H and $C_1$ to $C_6$ alkyl, each R" is independently selected from H and $C_1$ to $C_{22}$ alkyl, wherein each alkylene,
(Continued)

Filtration efficiency of inventive and comparative electret melt-blown webs at 1, 24 and 168 hours after charging alkenylene and alkyl group may optionally be substituted by deuterium or fluorine, and the two substituents on the central benzene ring may be either positioned in an ortho, meta or para relationship; wherein the polypropylene composition (PC) has an $MFR_2$ of from 400 to 5000 g/10 min and a melting temperature Tm of from 140 to 170° C.

(I)

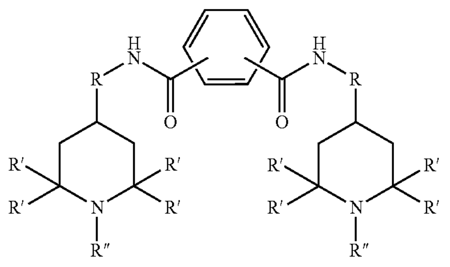

15 Claims, 1 Drawing Sheet

(51) Int. Cl.

| | |
|---|---|
| ***D01F 1/10*** | (2006.01) |
| ***D01F 6/06*** | (2006.01) |
| ***D04H 1/4291*** | (2012.01) |
| ***D04H 1/56*** | (2006.01) |
| ***D04H 3/16*** | (2006.01) |
| ***D06M 10/00*** | (2006.01) |
| *D06M 101/20* | (2006.01) |

(52) U.S. Cl.

CPC ............ *D01F 6/06* (2013.01); *D04H 1/4291* (2013.01); *D04H 1/56* (2013.01); *D04H 3/16* (2013.01); *D06M 10/00* (2013.01); *B01D 2239/0435* (2013.01); *B01D 2239/0618* (2013.01); *B01D 2239/0622* (2013.01); *B01D 2239/10* (2013.01); *B01D 2239/1258* (2013.01); *D06M 2101/20* (2013.01); *D06M 2200/00* (2013.01); *D10B 2321/022* (2013.01); *D10B 2401/00* (2013.01); *D10B 2505/04* (2013.01)

(56) References Cited

U.S. PATENT DOCUMENTS

| | | | | |
|---|---|---|---|---|
| 2005/0004828 A1 | 1/2005 | Desilva et al. | | |
| 2005/0028851 A1 | 2/2005 | Knoepp | | |
| 2005/0048281 A1* | 3/2005 | Royer | D02G 3/346 428/364 | |
| 2005/0288510 A1* | 12/2005 | Mader | C08K 5/3435 546/186 | |
| 2015/0191852 A1* | 7/2015 | Galvan | D04H 3/16 442/401 | |
| 2019/0169409 A1* | 6/2019 | Wang | C08L 23/12 | |
| 2019/0284739 A1* | 9/2019 | Wang | D04H 1/559 | |
| 2020/0231765 A1 | 7/2020 | Sumita et al. | | |
| 2020/0291549 A1* | 9/2020 | Sick | D01F 1/106 | |

FOREIGN PATENT DOCUMENTS

| | | | | |
|---|---|---|---|---|
| EP | 0887379 B1 | 12/1998 | | |
| EP | 2005453 A1 | 12/2008 | | |
| EP | 2609238 A1 | 7/2013 | | |
| EP | 2414573 A2 | 8/2013 | | |
| EP | 2294257 A2 | 1/2014 | | |
| EP | 2938420 A1 | 11/2015 | | |
| EP | 2986354 A2 | 6/2017 | | |
| JP | 6497082 B2 | 4/2019 | | |
| WO | 92/12182 A1 | 7/1992 | | |
| WO | 99/24478 A1 | 5/1999 | | |
| WO | 99/24479 A1 | 5/1999 | | |
| WO | 00/68315 A1 | 11/2000 | | |
| WO | 2004/000899 A1 | 12/2003 | | |
| WO | 2004/111095 A1 | 12/2004 | | |
| WO | 2008/122525 A1 | 10/2008 | | |
| WO | 2019/179959 A1 | 9/2019 | | |
| WO | WO-2021226049 A1 * | 11/2021 | B01D 46/0001 | |

OTHER PUBLICATIONS

H.N. Cheng, "13C NMR Analysis of Ethylene-Propylene Rubbers", Macromolecules 1984, 17, 1950-1955.

Resconi, Luigi, et al. "Selectivity in Propene Polymerization with Metallocene Catalysts" Chem Rev. 2000, 100, 1253-1345.

Vincent Busico, et al., "Alk-1-ene Polymerization in the Presence of a Monocyclopentadienyl Zirconium(IV) Acetamidinate Catalyst: Microstructural and Mechanistic Insights", Macromol. Rapid Commun. 2007, 28, 1128-1134.

Wen-Jun Wang, et al., "Structural Analysis of Ethylene/Propylene Copolymers Synthesized with a Constrained Geometry Catalyst" Macromolecules 2000, 33, 1157-1162.

Zhe Zhou, et al., "A new decoupling method for accurate quantification of polyethylene copolymer composition and triad sequence distribution with 13C NMR" Journal of Magnetic Resonance 187 (2007) 225-233.

Zweifel, Hans, Plastics Additives Handbook, 5th Edition, 2001, 956-965.

European Application No. 21152814.6, Extended Search Report Jul. 9, 2021.

Korean Application No. 10-2023-7026681, Office Action dated Aug. 11, 2025.

* cited by examiner

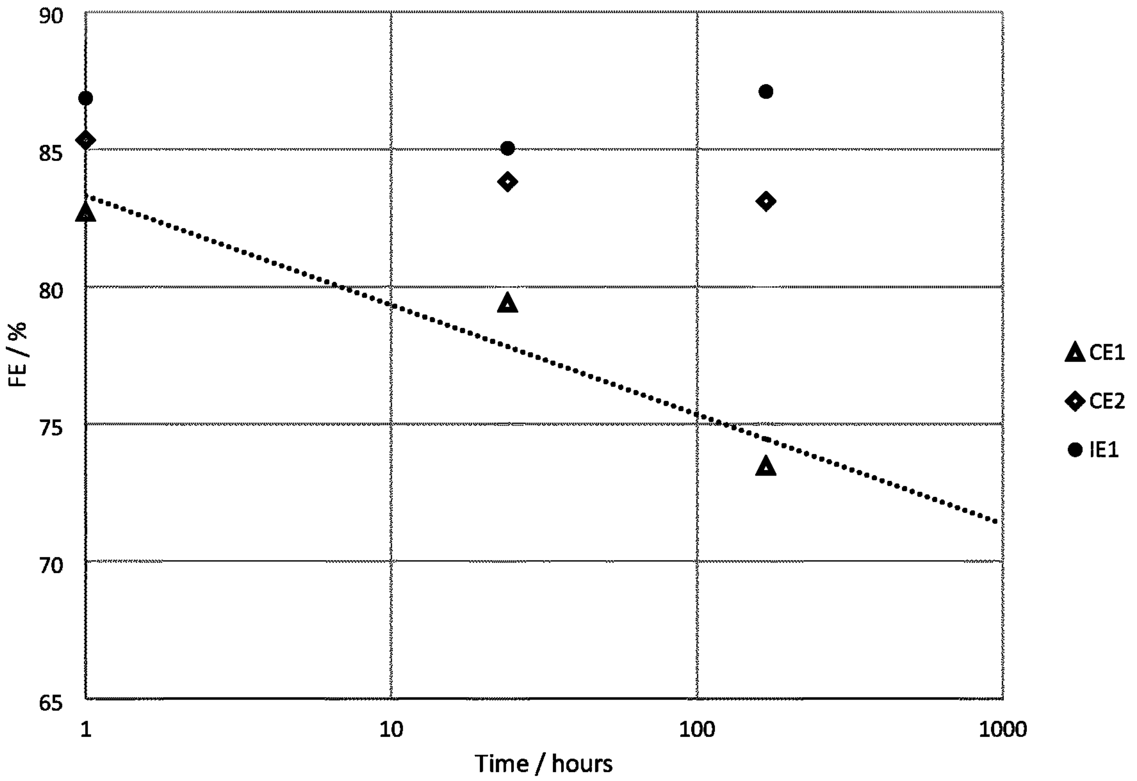
Filtration efficiency of inventive and comparative electret melt-blown webs at 1, 24 and 168 hours after charging

POLYPROPYLENE COMPOSITION CONTAINING A NEW CHARGE-STABILIZING AGENT FOR ELECTRET MELT BLOWN WEBS

FIELD OF THE INVENTION

The present invention relates to a polypropylene composition comprising a certain charge-stabilizing agent, melt-blown webs and electret melt-blown webs made from said composition, a process for making said melt-blown webs and electret melt-blown webs and a use of the certain charge-stabilizing agent for stabilizing the charge of an electret material.

BACKGROUND TO THE INVENTION

A melt-blown web, being a non-woven structure consisting of melt-blown fibers, is typically made in a one-step process in which high-velocity air blows a molten thermoplastic resin from an extruder die tip onto a conveyor or take-up screen to form fine fibered self-bonding web. Although many types of polymers can be employed for melt-blown fibers and fabrics, polypropylene is one of the most commonly used polymers.

Melt-blown webs are often employed for their filtering properties. Whilst optimized filtration properties are of high importance in a number of long-established fields, they are increasingly critical since the spread of the COVID-19 pandemic, with facemasks having beneficial filtering properties particularly valuable. In this context, and indeed in most applications, beneficial filtering properties include having a high filtration efficiency (i.e. remove a high proportion of particles) and a low pressure drop (i.e. allowing gasses such as air to pass through the filter relative easily, enabling the user of a facemask to breath more easily).

Facemasks having particularly high filtration efficiency, such as N95 masks, often involve polypropylene melt-blown webs that have been electrostatically charged. Polypropylene is a natural electret, meaning that it is able to support a permanent electric dipole due to its dielectric properties. Electrostatically charged filters have noticeably increased filtration efficiency without an accompanying jump in the pressure drop.

Factors known to influence the filtration performance of such melt-blown webs include the selection of an appropriate polypropylene base material, optimization of the charging method, and the use of charge stabilizing additives.

Charge-stabilizing additives are of particular importance, since the addition of a very small amount of a compound having a large effect on the final properties is particularly economic.

A number of charge-stabilizing additives are known in the art.

Exemplary charge stabilizing additives include magnesium stearate (RSC Advance, 2018, 8, 7932), trisamide derivatives (EP 2 294 257 A2), hydroxyamides (EP 2 005 453 A1), F-free heterocyclic imides (EP 2 414 573 A2), arylamino-substituted benzoic acids/salts (EP 2 986 354 A2) and substituted-mercaptobenizidyolate salts (EP 2 938 420 A1), as well as multicomponent systems (EP 2 609 238 A1).

Whilst many of these additives are useful charge-stabilizing agents, some have other functionalities as well (for example being visbreaking agents), which place restrictions on the choice of the polypropylene base material.

Given the importance of these additives, the development of new charge stabilizing agents is always desirable, especially if improved filtration properties can be obtained both directly after charging and also after a period of time, indicating good charge retention.

SUMMARY OF THE INVENTION

The present invention is based upon the finding that certain charge-stabilizing agents, previously only known for their use as heat and UV/light stabilizers for polyamides, specifically for nylons, act as surprisingly effective charge-stabilizers for polypropylene-based electrets.

The present invention is consequently directed to a polypropylene composition (PC) comprising:

i) from 95.0 to 99.99 wt.-%, based on the total weight of the composition, of a polypropylene (PP), preferably a propylene homopolymer (HPP); and ii) from 0.01 to 5.0 wt.-%, based on the total weight of the composition, of a compound according to Formula (I)

(I)

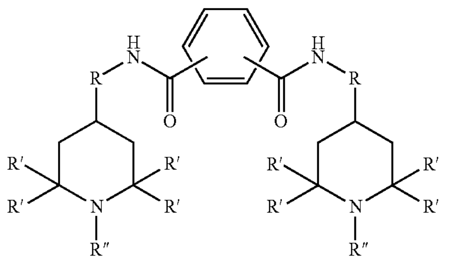

wherein each R is independently selected from $C_1$ to $C_6$ alkylene, $C_2$ to $C_6$ alkenylene and a single bond, each R' is independently selected from H and $C_1$ to $C_6$ alkyl, each R" is independently selected from H and $C_1$ to $C_{22}$ alkyl, wherein each alkylene, alkenylene and alkyl group may optionally be substituted by deuterium or fluorine, and the two substituents on the central benzene ring may be either positioned in an ortho, meta or para relationship;

wherein the individual content of the polypropylene (PP), more preferably the propylene homopolymer (HPP), and the compound according to Formula (I) add up to at least 98.0 wt.-%, more preferably at least 99.0 wt.-%, based on the total weight of the composition, and wherein the polypropylene (PP), more preferably the propylene homopolymer (HPP), has a melt flow rate $MFR_2$, determined according to ISO 1133 at 230° C. at a load of 2.16 kg, in the range from 400 to 5000 g/10 min and a melting temperature Tm, determined by differential scanning calorimetry (DSC) according to ISO 11357, in the range from 140 to 170° C.

In another aspect, the present invention is directed to melt-blown webs made from the polypropylene composition (PC) of the present invention.

The present invention is further directed to a process for producing the melt-blown webs of the present invention, comprising the steps of:

(a.i) providing polypropylene (PP1), more preferably propylene homopolymer (HPP1);

or (a.ii) or providing polypropylene (PP2), more preferably propylene homopolymer (HPP2), and a visbreaking agent, preferably a peroxide radical generator;

and (b) providing the compound according to Formula (I);

(c) pelletizing a mixture of the components provided in steps (a) and (b) in a pelletizer to obtain a polypropylene composition (PC) comprising 95.0 to 99.9 wt.-%, based on the total weight of the composition, of the polypropylene (PP), more preferably the propylene homopolymer (HPP), and 0.01 to 5.0 wt.-%, based on the total weight of the composition, of the compound according to Formula (I);

(d) melt-blowing the blended pellets obtained in step (c); and (e) preferably electrostatically charging the melt-blown web obtained in step (d) to obtain an electret melt-blown web.

In a final aspect, the present invention is directed to a use of a compound according to Formula (I) for the stabilization of charge in an electret melt-blown web made from a polypropylene composition (PC) comprising:

i) from 95.0 to 99.99 wt.-%, based on the total weight of the composition, of a polypropylene (PP), preferably a propylene homopolymer (HPP); and ii) from 0.01 to 5.0 wt.-%, based on the total weight of the composition, of the compound according to Formula (I)

(I)

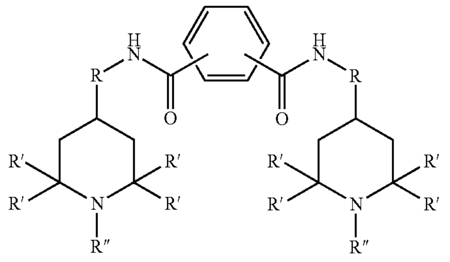

wherein each R is independently selected from $C_1$ to $C_6$ alkylene, $C_2$ to $C_6$ alkenylene and a single bond, each R' is independently selected from H and $C_1$ to $C_6$ alkyl, each R" is independently selected from H and $C_1$ to $C_{22}$ alkyl, wherein each alkylene, alkenylene and alkyl group may optionally be substituted by deuterium or fluorine, and the two substituents on the central benzene ring may be either positioned in an ortho, meta or para relationship;

wherein the individual content of the polypropylene (PP), more preferably the propylene homopolymer (HPP), and the compound according to Formula (I) add up to at least 98.0 wt.-%, more preferably at least 99.0 wt.-%, based on the total weight of the composition, and wherein the polypropylene (PP), more preferably the propylene homopolymer (HPP), has a melt flow rate $MFR_2$, determined according to ISO 1133 at 230° C. at a load of 2.16 kg, in the range from 400 to 5000 g/10 min and a melting temperature Tm, determined by differential scanning calorimetry (DSC) according to ISO 11357, in the range from 140 to 170° C.

Definitions

A propylene homopolymer is a polymer that essentially consists of propylene monomer units. Due to impurities especially during commercial polymerization processes, a propylene homopolymer can comprise up to 1.0 mol % comonomer units, preferably up to 0.5 mol % comonomer units, more preferably up to 0.1 mol % comonomer units, yet more preferably up to 0.05 mol % comonomer units and most preferably up to 0.01 mol % comonomer units. It is particularly preferred that propylene is the only detectable monomer. A propylene random copolymer is a copolymer of propylene monomer units and comonomer units, preferably selected from ethylene and C4-C12 alpha-olefins, in which the comonomer units are distributed randomly over the polymeric chain. A propylene random copolymer can comprise comonomer units from one or more comonomers different in their amounts of carbon atoms. In the following amounts are given in % by weight (wt.-%) unless it is stated otherwise.

An electret is a dielectric material that has a quasi-permanent electrostatic charge or dipole polarization. This may be envisaged as being the electrostatic equivalent of a permanent magnet. In the context of the present invention, electrets are identified as any material that bears a quasi-permanent electrostatic charge, i.e. is electrostatically charged. The phrase “is electrostatically charged” when used in the context of the present invention does not indicate how the charge was generated, but that the material possesses an electrostatic charge, as opposed to bearing a charge that results from ion-containing components such as metal salts or cationic or anionic comonomers in a polyolefin. The electrostatic charge can be introduced by a number of methods known to the person skilled in the art, including but not limited to, electrostatic spinning, corona charging, tribocharging, hydro-charging or in an electrical field.

DETAILED DESCRIPTION

The Polypropylene (PP)

One essential component of the polypropylene composition (PC) is the polypropylene (PP).

The polypropylene (PP) may be selected from propylene homopolymers (HPPs), propylene random copolymers (RPPs) and hetereophasic propylene copolymers (HECOs). Preferably, the polypropylene (PP) is a propylene homopolymer (HPP).

The polypropylene (PP), more preferably the propylene homopolymer (HPP), has a melt flow rate $MFR_2$, determined according to ISO 1133 at 230° C. at a load of 2.16 kg, in the range from 400 to 5000 g/10 min, more preferably in the range from 500 to 3000 g/10 min, yet more preferably in the range from 600 to 2000 g/10 min, most preferably in the range from 700 to 1800 g/10 min.

The polypropylene (PP), more preferably the propylene homopolymer (HPP), has a melting temperature Tm, determined by differential scanning calorimetry (DSC) according to ISO 11357, in the range from 140 to 170° C.

In one embodiment, the polypropylene (PP) has been polymerized in the presence of a Ziegler-Natta catalyst. Ziegler-Natta-catalysed polypropylene is typified by relatively high melting points and an absence of 2,1 erythro regiodefects.

Consequently, in this one embodiment, the polypropylene (PP), more preferably the propylene homopolymer (HPP), is free of 2,1 erythro regiodefects, as determined by $^{13}$C-NMR spectroscopy.

In this same embodiment, the polypropylene (PP), more preferably the propylene homopolymer (HPP), has a melting temperature Tm, determined by differential scanning calorimetry (DSC) according to ISO 11357, in the range from 155 to 170° C., more preferably in the range from 157 to 167° C., most preferably in the range from 159 to 165° C.

In an alternative embodiment, the polypropylene (PP), more preferably the propylene homopolymer (HPP), has been polymerized in the presence of a single site catalyst (SSC). SSC-catalysed polypropylene is typified by relatively low melting points and the presence of 2,1 erythro regiodefects, as well as often high isotactic pentad concentration (mmmm).

Consequently, in this alternative embodiment, the polypropylene (PP), more preferably the propylene homopolymer (HPP), preferably has a content of 2,1 erythro regiodefects, as determined by $^{13}$C-NMR spectroscopy, in the range from 0.01 to 1.5 mol %, more preferably in the range from 0.10 to 1.2 mol %, yet more preferably in the range from 0.20 to 1.0 mol %, still more preferably in the range from 0.30 to 0.80 mol %, most preferably in the range from 0.40 to 0.70 mol%.

In this same alternative embodiment, the polypropylene (PP), more preferably the propylene homopolymer (HPP), preferably has a melting temperature Tm, determined by differential scanning calorimetry (DSC) according to ISO 11357, in the range from 140 to 160° C., more preferably in the range from 148 to 159° C., most preferably in the range from 152 to 158° C.

In this same alternative embodiment, it is particularly preferred that the propylene homopolymer (HPP) has a content of 2,1 erythro regiodefects, as determined by $^{13}$C-NMR spectroscopy, in the range from 0.50 to 1.5 mol %, more preferably in the range from 0.50 to 1.2 mol %, yet more preferably in the range from 0.50 to 1.0 mol %, still more preferably in the range from 0.50 to 0.80 mol %, most preferably in the range from 0.50 to 0.70 mol %.

In this same alternative embodiment, it is also preferred that the propylene homopolymer (HPP) has an isotactic pentad concentration (mmmm), as determined by $^{13}$C-NMR spectroscopy, in the range from 95.0 to 100.0%, more preferably in the range from 97.0 to 99.99%, most preferably in the range from 98.0 to 99.9%.

The polypropylene (PP) is further characterised by its molecular weight properties.

It is preferred that the polypropylene (PP), more preferably the propylene homopolymer (HPP), has a molecular weight distribution (Mw/Mn), determined by Gel Permeation Chromatography in the range from 1.0 to 6.0, more preferably in the range from 1.5 to 5.0, most preferably in the range from 2.0 to 4.5.

In the embodiment wherein the polypropylene (PP), more preferably the propylene homopolymer (HPP), has been polymerized in the presence of a Ziegler-Natta catalyst, it is preferred that the polypropylene (PP), more preferably the propylene homopolymer (HPP), has a molecular weight distribution (Mw/Mn), determined by Gel Permeation Chromatography in the range from 1.5 to 6.0, more preferably in the range from 2.0 to 5.0, most preferably in the range from 2.5 to 4.5.

In the embodiment wherein the polypropylene (PP), more preferably the propylene homopolymer (HPP), has been polymerized in the presence of a single site catalyst, it is preferred that the polypropylene (PP), more preferably the propylene homopolymer (HPP), has a molecular weight distribution (Mw/Mn), determined by Gel Permeation Chromatography in the range from 1.0 to 5.0, more preferably in the range from 1.5 to 4.5, most preferably in the range from 2.0 to 4.0.

It is preferred that the polypropylene (PP), more preferably the propylene homopolymer (HPP), has a weight average molecular weight Mw, determined by Gel Permeation Chromatography, in the range from 25,000 to 85,000, more preferably in the range from 35,000 to 80,000, most preferably in the range from 45,000 to 75,000.

It is preferred that the propylene homopolymer (HPP) has a xylene soluble content (XCS), determined at 25° C. according ISO 16152, in the range from 0.1 to 4.0 wt.-%, more preferably in the range from 0.2 to 3.0 wt.-%, most preferably in the range from 0.5 to 2.0 wt.-%.

All given properties of the polypropylene (PP) refer to the polypropylene (PP) as it is present in the polypropylene composition (PC). In some cases the properties of the polypropylene (PP) may be different to the precursor polypropylene used to prepare the polypropylene composition (i.e. before mixing or compounding with the compound according to Formula (I) and any further components). Significant differences are observed as the result of visbreaking processes, well understood by the person skilled in the art as methods for adjusting the rheological properties of polypropylenes post reactor.

In the simplest case, the polypropylene (PP) has not been visbroken. Consequently, the polypropylene (PP), more preferably the propylene homopolymer (HPP) is substantially the same as the polypropylene (PP1), more preferably the propylene homopolymer (HPP1), used to prepare the polypropylene composition (PC).

With regard the polymer properties, i.e. $MFR_2$, Tm, concentration of 2,1 erythro regio defects, molecular weight and molecular weight distribution, the ranges and preferred embodiments of the polypropylene (PP), more preferably the propylene homopolymer (HPP), apply mutatis mutandis to the polypropylene (PP1), more preferably the propylene homopolymer (HPP1), used to prepare the polypropylene composition (PC).

In another embodiment the polypropylene (PP), more preferably the propylene homopolymer (HPP), according to the present invention may be the product of visbreaking a precursor polypropylene (PP2), more preferably a precursor propylene homopolymer (HPP2), using a visbreaking agent.

Preferably, the visbreaking agent used in this process is a peroxide radical generator.

Typical peroxide radical generators are 2,5-dimethyl-2,5-bis(tert-butylperoxy)hexane (DHBP) (for instance sold under the tradenames Luperox 101 and Trigonox 101), 2,5-dimethyl-2,5-bis(tert-butylperoxy)3-hexyne (DYBP) (for instance sold under the tradenames Luperox 130 and Trigonox 145), dicumyl peroxide (DCUP) (for instance sold under the tradenames Luperox DC and Perkadox BC), ditert-butyl peroxide (DTBP) (for instance sold under the tradenames Trigonox B and Luperox Di), tert-butylcumyl peroxide (BCUP) (for instance sold under the tradenames Trigonox T and Luperox 801) and bis(tert-butylperoxyisopropyl)benzene (DIPP) (for instance sold under the tradenames Perkadox 14S and Luperox DC).

Preferred peroxides are 2,5-dimethyl-2,5-bis(tert-butylperoxy)hexane (DHBP) and tert-butylcumyl peroxide (BCUP).

It is within the scope of the present invention to use either one specific peroxide or mixtures of different peroxides.

With regard to the Tm and concentration of 2,1 erythro regio defects, the ranges and preferred embodiments of the polypropylene (PP), more preferably the propylene homopolymer (HPP), apply mutatis mutandis to the precursor polypropylene (PP2), more preferably the precursor propylene homopolymer (HPP2). This means that the precursor polypropylene (PP2), more preferably the precursor homopolymer (HPP2) may be polymerized in the presence of a Ziegler-Natta catalyst or in the presence of a single site catalyst, with the associated properties as described above.

Other properties of polypropylene are known to change significantly as a result of visbreaking.

It is preferred that the melt flow rate $MFR_2$, determined according to ISO 1133 at 230° C. at a load of 2.16 kg, of the precursor polypropylene (PP2), more preferably the precursor propylene homopolymer (HPP2), is in the range from 50 to 399 g/10 min, more preferably in the range from 65 to 300 g/10 min, most preferably in the range from 75 to 250 g/10 min.

It is preferred that the precursor polypropylene (PP2), more preferably the precursor propylene homopolymer (HPP2), has a molecular weight distribution (Mw/Mn), determined by Gel Permeation Chromatography in the range from 2.0 to 10.0, more preferably in the range from 2.0 to 9.0, most preferably in the range from 2.0 to 8.5.

In the embodiment wherein the precursor polypropylene (PP2), more preferably the precursor propylene homopolymer (HPP2), has been polymerized in the presence of a Ziegler-Natta catalyst, it is preferred that the precursor polypropylene (PP2), more preferably the precursor propylene homopolymer (HPP2), has a molecular weight distribution (Mw/Mn), determined by Gel Permeation Chromatography in the range from 3.0 to 10.0, more preferably in the range from 4.5 to 9.5, most preferably in the range from 5.5 to 9.0.

In the embodiment wherein the precursor polypropylene (PP2), more preferably the precursor propylene homopolymer (HPP2), has been polymerized in the presence of a single site catalyst, it is preferred that the precursor polypropylene (PP2), more preferably the precursor propylene homopolymer (HPP2), has a molecular weight distribution (Mw/Mn), determined by Gel Permeation Chromatography in the range from 2.0 to 6.0, more preferably in the range from 2.0 to 5.0, most preferably in the range from 2.0 to 4.5.

It is preferred that the precursor polypropylene (PP2), more preferably the precursor propylene homopolymer (HPP2), has a weight average molecular weight Mw, determined by Gel Permeation Chromatography, in the range from 50,000 to 140,000, more preferably in the range from 70,000 to 130,000, most preferably in the range from 80,000 to 120,000.

By visbreaking the polypropylene according to the present invention, the molar mass distribution (Mw/Mn) becomes narrower because the long molecular chains are more easily broken up or scissored and the molar mass M will decrease, corresponding to a $MFR_2$ increase.

Therefore, it is further preferred that the molecular weight ($M_w$) ratio of the $M_w$ of the polypropylene (PP), more preferably the propylene homopolymer (HPP), to the $M_w$ of the precursor polypropylene (PP2), more preferably the precursor propylene homopolymer (HPP2), $[M_w(PP)/M_w(PP2)]$ is <1, preferably ≤0.90, more preferably ≤0.85, still more preferably ≤0.80.

Similarly, the molecular weight distribution (Mw/Mn or MWD) ratio of the polypropylene (PP), more preferably the propylene homopolymer (HPP), to the molecular weight distribution (Mw/Mn or MWD of the precursor polypropylene (PP2), more preferably the precursor propylene homopolymer (HPP2),

[MWD(PP)/MWD(PP2)] is <1, preferably ≤0.95, more preferably ≤0.90, still more preferably ≤0.85, and most preferably ≤0.80.

The visbreaking ratio is defined as the melt flow rate $MFR_2$ of the polypropylene (PP), more preferably the propylene homopolymer (HPP), divided by the melt flow rate $MFR_2$ of the precursor polypropylene (PP2), more preferably the precursor propylene homopolymer (HPP2), wherein each melt flow rate $MFR_2$ is determined according to ISO 1133 at 230° C. at a load of 2.16 kg.

It is preferred that the visbreaking ratio is in the range from 3.0 to 40, more preferably in the range from 3.5 to 20, most preferably in the range from 4.0 to 10.

The polypropylene (PP1), more preferably the propylene homopolymer (HPP1), used to prepare the polypropylene composition (PC) or the precursor polypropylene (PP2), more preferably the precursor propylene homopolymer (HPP2), may be selected from commercially available polypropylene grades, or may be polymerized according to the following process.

Process for Forming the Polypropylene (PP1) or Precursor Polypropylene (PP2)

The polypropylene (PP1 or PP2), more preferably the propylene homopolymer (HPP1 or HPP2), is preferably produced by a single- or multistage process polymerization of propylene such as bulk polymerization, gas phase polymerization, slurry polymerization, solution polymerization or combinations thereof. Preferably, the polypropylene (PP1 or PP2), more preferably the propylene homopolymer (HPP1 or HPP2), can be made in a combination of loop and gas phase reactor. Those processes are well known to one skilled in the art.

A preferred multistage process is a "loop-gas phase"-process, such as developed by Borealis (known as BORSTAR® technology) described e.g. in patent literature, such as in EP 0 887 379, WO 92/12182, WO 2004/000899, WO 2004/111095, WO 99/24478, WO 99/24479 or in WO 00/68315.

A further suitable slurry-gas phase process is the Spheripol® process of Basell.

The catalyst used in the polymerization process may be any suitable catalyst for the polymerization of polypropylene.

In one embodiment, the polypropylene (PP1 or PP2), more preferably the propylene homopolymer (HPP1 or HPP2) is preferably obtainable by using a catalyst system comprising a Ziegler-Natta catalyst, wherein the Ziegler-Natta catalyst preferably comprises a magnesium halide support, a titanium component and an internal donor.

In an alternative embodiment, the polypropylene (PP1 or PP2), more preferably the propylene homopolymer (HPP1 or HPP2) is preferably obtainable by using a catalyst system comprising a single-site catalyst, more preferably being obtainable by using a metallocene catalyst complex and cocatalysts.

Preferred complexes of the metallocene catalyst include:

- rac-dimethylsilanediylbis[2-methyl-4-(3',5'-dimethylphenyl)-5-methoxy-6-tert-butylinden-l-yl] zirconium dichloride,
- rac-anti-dimethylsilanediyl[2-methyl-4-(4'-tert-butylphenyl)-inden-l-yl][2-methyl-4-(4'-tertbutylphenyl)-5-methoxy-6-tert-butylinden-l-yl] zirconium dichloride,
- rac-anti-dimethylsilanediyl[2-methyl-4-(4'-tert-butylphenyl)-inden-l-yl][2-methyl-4-phenyl-5-methoxy-6-tert-butylinden-l-yl] zirconium dichloride,
- rac-anti-dimethylsilanediyl[2-methyl-4-(3',5'-tert-butylphenyl)-1,5,6,7-tetrahydro-sindacen-l-yl][2-methyl-4-(3',5'-dimethyl-phenyl)-5-methoxy-6-tert-butylinden-l-yl] zirconium dichloride,
- rac-anti-dimethylsilanediyl[2-methyl-4,8-bis-(4'-tert-butylphenyl)-1,5,6,7-tetrahydro-sindacen-l-yl][2-methyl-4-(3',5'-dimethyl-phenyl)-5-methoxy-6-tert-butylinden-l-yl] zirconium dichloride, rac-anti-dimethylsilanediyl[2-methyl-4,8-bis-(3',5'-dimethylphenyl)-1,5,6,7-tetrahydro-s-indacen-l-yl] [2-methyl-4-(3',5'-dimethylphenyl)-5-methoxy-6-tert-butylinden-l-yl] zirconium dichloride, rac-anti-dimethylsilanediyl[2-methyl-4,8-bis-(3',5'-dimethylphenyl)-1,5,6,7-tetrahydro-s-indacen-l-yl][2-methyl-4-(3',5'-5ditert-butyl-phenyl)-5-methoxy-6-tert-butylinden-l-yl] zirconium dichloride.

Especially preferred is rac-anti-dimethylsilanediyl[2-methyl-4,8-bis-(3',5'-dimethylphenyl)-1,5,6,7-tetrahydro-s indacen-l-yl] [2-methyl-4-(3',5'-dimethylphenyl)-5-methoxy-6-tertbutylinden-l-yl] zirconium dichloride.

To form an active catalytic species it is normally necessary to employ a cocatalyst as is well known in the art.

According to the present invention a cocatalyst system comprising a boron containing cocatalyst and an aluminoxane cocatalyst is used in combination with the above defined metallocene catalyst complex.

The aluminoxane cocatalyst can be one of formula (II):

(II)

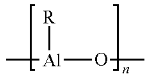

where n is from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, C1-C10-alkyl, preferably C1-C5-alkyl, or C3-C10-cycloalkyl, C7-C12-arylalkyl or -alkylaryl and/or phenyl or naphthyl, and where Y can be hydrogen, halogen, preferably chlorine or bromine, or C1-C10-alkoxy, preferably methoxy or ethoxy. The resulting oxygen-containing aluminoxanes are not in general pure compounds but mixtures of oligomers of the formula (II).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

Preferred boron containing cocatalysts for use in the invention include borates, in particular borates comprising the trityl, i.e. triphenylcarbenium, ion. Thus, the use of $Ph_3CB(PhF_5)_4$ or analogues thereof is especially favoured.

The catalyst system of the invention is used in supported form. The particulate support material used is silica or a mixed oxide such as silica-alumina, in particular silica. The use of a silica support is preferred. The skilled practitioner is aware of the procedures required to support a metallocene catalyst.

The Charge-stabilizing Agent

Another essential component of the polypropylene composition (PC) is a compound according to Formula (I):

(I)

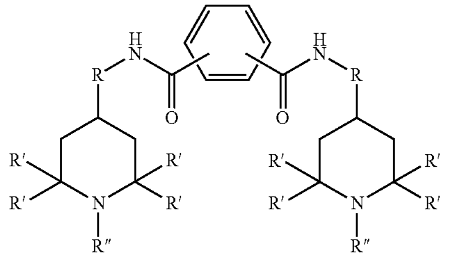

Each instance of R, R' and R" can be the same or different from each other instance of R, R' and R", as is reflected by the phrasing “independently selected”.

Each R is independently selected from $C_1$ to $C_6$ alkylene, $C_2$ to $C_6$ alkenylene and a single bond, more preferably selected from $C_1$ to $C_6$ alkylene and a single bond. It is further preferred that each R is independently selected from $C_1$ to $C_3$ alkylene and a single bond, more preferably methylene and a single bond. In a particularly preferred embodiment, both instances of R are single bonds.

Each R' is independently selected from H and $C_1$ to $C_6$ alkyl, more preferably from H and $C_1$ to $C_4$ alkyl. It is further preferred that each R' is independently selected from H, methyl and ethyl, more preferably from methyl and ethyl. In one particularly preferred embodiment, all instances of R' are the same, selected from methyl and ethyl, more preferably all instances of R' are methyl.

Each R" is independently selected from H and $C_1$ to $C_{22}$ alkyl, more preferably from H, methyl and ethyl. It is further preferred that each R" is independently selected from H and methyl. In one particularly preferred embodiment, both instances of R" are H.

In the above descriptions of substitution at R, R' and R", the definitions “alkylene”, “alkenylene” and “alkyl” group are to be understood as including linear or branched groups, optionally substituted by deuterium or fluorine.

The two substituents on the central benzene ring may be either positioned in an ortho, meta or para relationship. Preferably, the two substituents on the central benzene ring are positioned in a meta relationship.

In one particularly preferred combination, each R is independently selected from methylene and a single bond, each R' is independently selected from $C_1$ to $C_4$ alkyl, each R" is H and the two substituents on the central benzene ring are positioned in a meta relationship.

Most preferably, the compound according to Formula (I) is N,N'-Bis(2,2,6,6-tetramethyl-4-piperidinyl)-1,3-benzene dicarboxamide, which has a CAS-No. of 42774-15-2.

The Polypropylene Composition (PC)

The polypropylene composition (PC) according to the present invention comprises:

i) from 95.0 to 99.99 wt.-%, based on the total weight of the composition, of the polypropylene (PP), preferably the propylene homopolymer (HPP); and
ii) from 0.01 to 5.0 wt.-%, based on the total weight of the composition, of the compound according to Formula (I).

More preferably, the polypropylene composition (PC) according to the present invention comprises:

i) from 98.0 to 99.98 wt.-%, based on the total weight of the composition, of the polypropylene (PP), preferably the propylene homopolymer (HPP); and ii) from 0.02 to 2.0 wt.-%, based on the total weight of the composition, of the compound according to Formula (I).

Yet more preferably, the polypropylene composition (PC) according to the present invention comprises:

i) from 99.0 to 99.95 wt.-%, based on the total weight of the composition, of the polypropylene (PP), preferably the propylene homopolymer (HPP); and ii) from 0.05 to 1.0 wt.-%, based on the total weight of the composition, of the compound according to Formula (I).

Most preferably, the polypropylene composition (PC) according to the present invention comprises:

i) from 99.5 to 99.90 wt.-%, based on the total weight of the composition, of the polypropylene (PP), preferably the propylene homopolymer (HPP); and ii) from 0.10 to 0.5 wt.-%, based on the total weight of the composition, of the compound according to Formula (I).

The individual content of the polypropylene (PP), more preferably the propylene homopolymer (HPP), and the compound according to Formula (I) add up to at least 98.0 wt.-%, more preferably at least 99.0 wt.-%, yet more preferably at least 99.50 wt.-% most preferably at least 99.70 wt.-%.

The polypropylene composition of the present invention may comprise further components; however, it is preferred that the inventive polypropylene composition comprises as polymer components only the polypropylene (PP), more preferably the propylene homopolymer (HPP), as defined in the instant invention.

The remaining part up to 100.0 wt.-% may be accomplished by further additives known in the art; however, this remaining part shall be not more than 2.0 wt.-%, more preferably not more than 1.0 wt.-%, yet more preferably not more than 0.5 wt.-%, most preferably not more than 0.3 wt.-%, relative to the total weight of the polypropylene composition (PC).

The inventive polypropylene composition may comprise small amounts of additives selected from the group consisting of antioxidants, stabilizers, fillers, colorants, nucleating agents and antistatic agents. In general, they are incorporated during granulation of the powder product obtained in the polymerization.

Such additives are generally commercially available and are described, for example, in "Plastic Additives Handbook", pages 871 to 873, 5th edition, 2001 of Hans Zweifel.

The Melt-blown Webs

The present invention is further directed to melt-blown webs made from the polypropylene composition (PC).

In the context of the present invention, the term "made from" indicates that the polypropylene, and optional further components are fed into the melt-blowing apparatus for the formation of melt-blown webs.

In particular, it is preferred that the melt-blown webs comprise at least 80.0 wt.-%, preferably at least 85.0 wt.-%, more preferably at least 90.0 wt.-%, still more preferably at least 95.0 wt.-% based on the total weight of the melt-blown webs, most preferably consist of, of the polypropylene composition (PC) as defined above.

Thus, a further component may be present in the melt-blown webs according to the invention. Such further component is a further polymer, which is preferably also a polypropylene based polymer.

It is within the skill of an art skilled person to choose a suitable additional polymer in a way that the desired properties of the melt-blown webs are not negatively affected.

In a particularly preferred embodiment of the present invention, the melt-blown webs are electret melt-blown webs.

Uncharged melt-blown webs can be electrostatically charged to make electret melt-blown webs. The electrostatic charging of the melt-blown web may be any method of electrostatic charging known to the person skilled in the art. Preferably, the melt-blown web is electrostatically charged via electrostatic spinning, corona charging, tribocharging, hydro-charging or in an electrical field, more preferably corona charging or in an electric field, most preferably in an electric field.

It is preferred that the melt-blown webs, more preferably the electret melt-blown webs, of the present invention have a filtration efficiency determined according to EN 1822-3 using a test filter area of 400 $cm^2$, measured 168 hours after charging, of at least 75%, more preferably of at least 80%, most preferably of at least 85%.

It is furthermore preferred that the melt-blown webs, more preferably the electret melt-blown webs, of the present invention have a quality factor, measured 168 hours after charging, of at least 2.20, more preferably at least 2.50, most preferably at least 2.70.

It is further preferred that the melt-blown webs, more preferably the electret melt-blown webs, have a filtration efficiency value determined according to EN 1822-3 using a test filter area of 400 $cm^2$ measured 168 hours after charging of at least 98.0%, more preferably of at least 99.0%, most preferably of at least 100.0% of the value of the filtration efficiency measured 1 hour after charging.

Preferably, the melt-blown webs according to the present invention have a weight per unit area in the range of 1 to 1000 $g/m^2$, more preferably in the range of 4 to 500 $g/m^2$, yet more preferably in the range of 7 to 250 $g/m^2$, still more preferably in the range of 8 to 200 $g/m^2$, most preferably in the range of 15 to 150 $g/m^2$.

The Process for Forming the Melt-blown Web

The present invention is further directed to a process for producing a melt-blown web according to the present invention, comprising the steps of:

(a.i) providing polypropylene (PP1), more preferably propylene homopolymer (HPP1); or (a.ii) or providing polypropylene (PP2), more preferably propylene homopolymer (HPP2), and a visbreaking agent, preferably a peroxide radical generator; and (b) providing the compound according to Formula (I);

(c) pelletizing a mixture of the components provided in steps (a) and (b) in a pelletizer to obtain a polypropylene composition (PC) comprising 95.0 to 99.9 wt.-%, based on the total weight of the composition, of the polypropylene (PP), more preferably the propylene homopolymer (HPP), and 0.01 to 5.0 wt.-%, based on the total weight of the composition, of the compound according to Formula (I);

(d) melt-blowing the blended pellets obtained in step (c); and (e) preferably electrostatically charging the melt-blown web obtained in step (d) to obtain an electret melt-blown web.

In one embodiment, the process produces an uncharged melt-blown web and the process comprises the steps of:

(a.i) providing polypropylene (PP1), more preferably propylene homopolymer (HPP1); or (a.ii) or providing polypropylene (PP2), more preferably propylene homopolymer (HPP2), and a visbreaking agent, preferably a peroxide radical generator; and (b) providing the compound according to Formula (I);

(c) pelletizing a mixture of the components provided in steps (a) and (b) in a pelletizer to obtain a polypropylene composition (PC) comprising 95.0 to 99.9 wt-.%, based on the total weight of the composition, of the polypropylene (PP), more preferably the propylene homopolymer (HPP), and 0.01 to 5.0 wt.-%, based on the total weight of the composition, of the compound according to Formula (I); and (d) melt-blowing the blended pellets obtained in step (c).

In a preferred embodiment, the process produces an electret melt-blown web and the process comprises the steps of:

(a.i) providing polypropylene (PP1), more preferably propylene homopolymer (HPP1); or (a.ii) or providing polypropylene (PP2), more preferably propylene homopolymer (HPP2), and a visbreaking agent, preferably a peroxide radical generator; and (b) providing the compound according to Formula (I);

(c) pelletizing a mixture of the components provided in steps (a) and (b) in a pelletizer to obtain a polypropylene composition (PC) comprising 95.0 to 99.9 wt-.%, based on the total weight of the composition, of the polypropylene (PP), more preferably the propylene homopolymer (HPP), and 0.01 to 5.0 wt.-%, based on the total weight of the composition, of the compound according to Formula (I);

(d) melt-blowing the blended pellets obtained in step (c); and (e) electrostatically charging the melt-blown web obtained in step (d) to obtain an electret melt-blown web.

The electrostatic charging of the melt-blown web in step (e) may be any method of electrostatic charging known to the person skilled in the art. Preferably the melt-blown web is electrostatically charged via electrostatic spinning, corona charging, tribocharging, hydro-charging or in an electrical field, more preferably corona charging or in an electric field, most preferably in an electric field.

The melt-blowing of step (d) is not particularly limited, and can be any melt-blowing procedure known to the person skilled in the art.

The option for selection between step (a.i) and (a.ii) reflects the selection from non-visbroken and visbroken polypropylenes respectively.

If the polypropylene composition (PC) is a visbroken composition, then step (a.ii) is selected in preference to step (a.i). It is further preferred that a peroxide radical generator is used as the visbreaking agent.

Typical peroxide radical generators are 2,5-dimethyl-2,5-bis(tert-butylperoxy)hexane (DHBP) (for instance sold under the tradenames Luperox 101 and Trigonox 101), 2,5-dimethyl-2,5-bis(tert-butylperoxy)3-hexyne (DYBP) (for instance sold under the tradenames Luperox 130 and Trigonox 145), dicumyl peroxide (DCUP) (for instance sold under the tradenames Luperox DC and Perkadox BC), ditert-butyl peroxide (DTBP) (for instance sold under the tradenames Trigonox B and Luperox Di), tert-butylcumyl peroxide (BCUP) (for instance sold under the tradenames Trigonox T and Luperox 801) and bis(tert-butylperoxyisopropyl)benzene (DIPP) (for instance sold under the tradenames Perkadox 14S and Luperox DC).

Preferred peroxides are 2,5-dimethyl-2,5-bis(tert-butylperoxy)hexane (DHBP) and tert-butylcumyl peroxide (BCUP).

It is within the scope of the present invention to use either one specific peroxide or mixtures of different peroxides.

The peroxide may be part of a masterbatch.

In the context of the present invention, "masterbatch" means a concentrated premix of a propylene polymer with an additive, in this case a free radical forming agent (peroxide).

The peroxide compound may preferably be contained in the peroxide masterbatch composition in a range of from 1 to 50 wt.-%, like from 5 to 40 wt.-%, based on the total composition of the masterbatch.

The compound according to Formula (I) may be part of a masterbatch.

In the context of the present invention, "masterbatch" means a concentrated premix of a propylene polymer with an additive, in this case the compound according to Formula (I).

The compound according to Formula (I) may preferably be contained in the masterbatch composition in a range of from 1 to 50 wt.-%, like from 5 to 40 wt.-%, based on the total composition of the masterbatch.

The Use

In a final aspect, the present invention is directed to a use of a compound according to Formula (I) for the stabilization of charge in an electret melt-blown web made from a polypropylene composition (PC) comprising:

i) from 95.0 to 99.99 wt.-%, based on the total weight of the composition, of a polypropylene (PP), preferably a propylene homopolymer (HPP); and ii) from 0.01 to 5.0 wt.-%, based on the total weight of the composition, of the compound according to Formula (I)

(I)

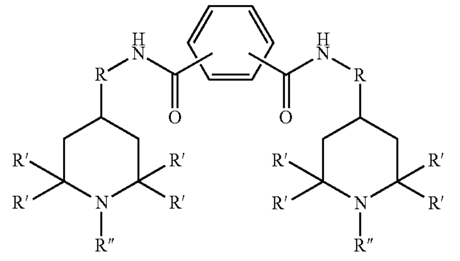

wherein each R is independently selected from $C_1$ to $C_6$ alkylene, $C_2$ to $C_6$ alkenylene and a single bond, each R' is independently selected from H and $C_1$ to $C_6$ alkyl, each R" is independently selected from H and $C_1$ to $C_{22}$ alkyl, wherein each alkylene, alkenylene and alkyl group may optionally be substituted by deuterium or fluorine, and the two substituents on the central benzene ring may be either positioned in an ortho, meta or para relationship;

wherein the individual content of the polypropylene (PP), more preferably the propylene homopolymer (HPP), and the compound according to Formula (I) add up to at least 98.0 wt.-%, more preferably at least 99.0 wt.-%, based on the total weight of the composition, and wherein the polypropylene composition (PC) has a melt flow rate $MFR_2$, determined according to ISO 1133 at 230° C. at a load of 2.16 kg, in the range from 400 to 5000 g/10 min and a melting temperature Tm, determined by differential scanning calorimetry (DSC) according to ISO 11357, in the range from 140 to 170° C.

The stabilization of charge in the electret melt-blown web is preferably defined as having a filtration efficiency value measured 168 hours after charging of at least 98.0%, more preferably of at least 99.0%, most preferably of at least 100.0% of the value of the filtration efficiency measured 1 hour after charging.

All preferable embodiments and technical features discussed in the preceding sections apply mutatis mutandis to the use according to the present invention.

EXAMPLES

1. Definitions/Measuring Methods

The following definitions of terms and determination methods apply for the above general description of the invention as well as to the below examples unless otherwise defined.

$MFR_2$ (230° C.) was measured according to ISO 1133 (230° C., 2.16 kg load).

Quantification of Microstructure by NMR Spectroscopy

Quantitative nuclear-magnetic resonance (NMR) spectroscopy was used to quantify the comonomer content of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$, respectively. All spectra were recorded using a $^{13}C$ optimized 10 mm extended temperature probehead at 125° C. using nitrogen gas for all pneumatics. Approximately 200 mg of material was dissolved in 3 ml of 1,2-tetrachloroethane-$d_2$ (TCE-$_{d2}$) along with chromium-(III)-acetylacetonate ($Cr(acac)_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimized tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regiodefects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E+0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol }\%]=100*fE$$

The weight percent comonomer incorporation was calculated from the mole fraction:

$$E[\text{wt }\%]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

The xylene solubles (XCS, wt.-%): Content of xylene cold solubles (XCS) was determined at 25° C. according ISO 16152; first edition; 2005-07-01

Number average molecular weight ($M_n$), weight average molecular weight ($M_w$) and molecular weight distribution ($M_w/M_n$) were determined by Gel Permeation Chromatography (GPC) according to the following method:

The weight average molecular weight $M_w$ and the molecular weight distribution ($M_w/M_n$), wherein $M_n$ is the number average molecular weight and $M_w$ is the weight average molecular weight) was measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert.-butyl-4-methyl-phenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

DSC analysis, melting temperature ($T_m$) and heat of fusion ($H_f$), crystallization temperature ($T_c$) and heat of crystallization ($H_c$): measured with a TA Instrument Q2000 differential scanning calorimetry (DSC) on 5 to 7 mg samples. DSC was run according to ISO 11357/part 3/method C2 in a heat/cool/heat cycle with a scan rate of 10° C./min in the temperature range of −30 to +225° C. Crystallization temperature and heat of crystallization ($H_c$) are determined from the cooling step, while melting temperature and heat of fusion ($H_f$) are determined from the second heating step.

The glass transition temperature $T_g$ was determined by dynamic mechanical analysis according to ISO 6721-7. The measurements were done in torsion mode on compression molded samples (40×10×1 mm³) between −100° C. and +150° C. with a heating rate of 2° C./min and a frequency of 1 Hz.

Grammage of the web: The unit weight (grammage) of the webs in g/m² was determined in accordance with ISO 536:1995.

Filtration efficiency: Air filtration efficiency was determined based on EN 1822-3 for flat sheet filter media, using a test filter area of 400 cm². The particle retention was tested with a usual aerosol of di-ethyl-hexyl-sebacate (DEHS), calculating efficiency for the fraction with 0.4 μm diameter from a class analysis with 0.1 μm scale. An airflow of 16 $m^3 \cdot h^{-1}$ was used, corresponding to an airspeed of 0.11 $m \cdot s^{-1}$.

Pressure drop (Δp): The pressure drop was measured according to DIN ISO 9237 at an air speed (permeability) of 500 mm/s.

Quality factor: The quality factor (QF) is calculated based on the formula:

$$QF = \frac{-\ln(1 - FE)}{\Delta p} \times 100$$

in which FE is the filtration efficiency for the particle size of 0.4 μm and Δp is the measured pressure drop in Pa.

2. Examples

The catalyst used in the polymerization process for the precursor propylene homopolymer (HPP2) of the inventive and comparative examples was Anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl] zirconium dichloride as disclosed in WO 2019/179959 A1 as MC-2 (hereafter termed "the metallocene") and was produced as follows:

Preparation of MAO-silica Support

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (5.0 kg) was added from a feeding drum followed by careful pressuring and depressurizing with nitrogen using manual valves. Then toluene (22 kg) was added. The mixture was stirred for 15 min. Next 30 wt.-% solution of MAO in toluene (9.0 kg) from Lanxess was added via feed line on the top of the reactor within 70 min. The reaction mixture was then heated up to 90° C. and stirred at 90° C. for additional two hours. The slurry was allowed to settle and the mother liquor was filtered off The catalyst was washed twice with toluene (22 kg) at 90° C., following by settling and filtration. The reactor was cooled off to 60° C. and the solid was washed with heptane (22.2 kg). Finally MAO treated $SiO_2$ was dried at 60° under nitrogen flow for 2 hours and then for 5 hours under vacuum (−0.5 barg) with stirring. MAO treated support was collected as a free-flowing white powder found to contain 12.2% Al by weight.

Catalyst Synthesis 30 wt.-% MAO in toluene (0.7 kg) was added into a steel nitrogen blanked reactor via a burette at 20° C. Toluene (5.4 kg) was then added under stirring. The metallocene (93 g) was added from a metal cylinder followed by flushing with 1 kg toluene. The mixture was stirred for 60 minutes at 20° C. Trityl tetrakis(pentafluorophenyl) borate (91 g) was then added from a metal cylinder followed by a flush with 1 kg of toluene. The mixture was stirred for 1 h at room temperature. The resulting solution was added to a stirred cake of MAO-silica support prepared as described above over 1 hour. The cake was allowed to stay for 12 hours, followed by drying under $N_2$ flow at 60° C. for 2 h and additionally for 5 h under vacuum (−0.5 barg) under stirring.

Dried catalyst was sampled in the form of pink free flowing powder containing 13.9% A1 and 0.11% Zr.

Polymerization of HPP2 and Subsequent Compounding/Visbreaking

The polymerization conditions of HPP2 used in the inventive examples are indicated in Table 1. The polymerization was carried on a Borstar pilot plant, with prepolymerizer, loop and first gas phase reactor connected sequentially, in the presence of the catalyst described above. The pellet properties given in Table 1 are for pellets wherein the polymer powder resulting from the polymerization reactors was compounded and pelletized with 1000 ppm of Irganox 1010 (Pentaerythritol tetrakis(3-(3,5-di-tert-butyl-4-hydroxyphenyl)propionate, CAS-no. 6683-19-8, an antioxidant commercially available from BASF SE (DE)) and 500 ppm of calcium stearate (CAS-no. 1592-23-0, commercially available from Faci, IT), using a ZSK 57 twin screw extruder, with a melt temperature of 190° C.

TABLE 1

Preparation of the precursor propylene homopolymer (HPP2)

| | | HPP2 |
|---|---|---|
| Prepoly reactor | | |
| Temperature | [° C.] | 20 |
| Pressure | [kPa] | 4693 |
| Residence time | [h] | 0.38 |
| Loop reactor | | |
| Temperature | [° C.] | 70 |
| Pressure | [kPa] | 4916 |
| $MFR_2$ | [g/10 min] | 117 |
| XCS | [wt.-%] | 0.5 |

TABLE 1-continued

| Preparation of the precursor propylene homopolymer (HPP2) | | |
|---|---|---|
| | | HPP2 |
| Feed $H_2/C_3$ ratio | [mol/kmol] | 0.41 |
| Split | [wt.-%] | 64 |
| GPR | | |
| Temperature | [° C.] | 75 |
| Pressure | [kPa] | 2400 |
| $MFR_2$ | [g/10 min] | 156 |
| $H_2/C_3$ ratio | [mol/kmol] | 3.7 |
| Split | [wt.-%] | 36 |
| Pellets | | |
| $MFR_2$ | [g/10 min] | 158 |
| XCS | [wt.-%] | 0.9 |
| $T_m$ | [° C.] | 155 |
| $T_c$ | [° C.] | 114 |
| $M_w$ | [kg/mol] | 103500 |
| $M_w/M_n$ | [—] | 3.5 |
| mmmm | % | 98.5 |
| 2,1 erythro regiodefects | [mol %] | 0.6 |
| Tg below −20° C. | [° C.] | n.d. |
| Tg above −20° C. | [° C.] | 0 |

For the preparation of the comparative and inventive examples, the polymer powder resulting from the polymerization reactors was compounded and pelletized with 1700 ppm of Trigonox 101 (2,5-dimethyl-2,5-bis(tert-butylperoxy)hexane, CAS-no. 78-63-7, a peroxide-based visbreaking agent commercially available from AkzoNobel, NL), as well as certain additives, using a ZSK 57 twin screw extruder, with a melt temperature of 190° C.

For Comparative Example 1 (CE1), the choice of additives was 1000 ppm of Irganox 1010 (Pentaerythritol tetrakis (3-(3,5-di-tert-butyl-4-hydroxyphenyl)propionate, CAS-no. 6683-19-8, an antioxidant commercially available from BASF SE (DE)) and 500 ppm of calcium stearate (CAS-no. 1592-23-0, commercially available from Faci, IT). The visbroken $MFR_2$ is measured as 656 g/10 min, the Mw is measured as 63,700, and the MWD (Mw/Mn) is measured as 2.74.

The additives used for Comparative Example 2 (CE2) were 1000 ppm of Irganox 1010, 500 ppm of calcium stearate and 5000 ppm of magnesium stearate (CAS-no. 557-04-0, commercially available from Faci, IT). The visbroken $MFR_2$ is measured as 718 g/10 min, the Mw is measured as 62,700, and the MWD (Mw/Mn) is measured as 2.74.

The additives used for Inventive Example 1 (IE1) were 500 ppm of calcium stearate and 2000 ppm of NYLOSTAB S-EED (N,N'-Bis(2,2,6,6-tetramethyl-4-piperidinyl)-1,3-benzene dicarboxamide, CAS-no. 42774-15-2, commercially available from Clariant AG, CH). The chemical structure of NYLOSTAB S-EED is given by Formula III (III)

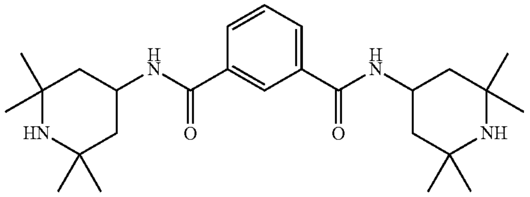

The visbroken $MFR_2$ is measured as 822 g/10 min, the Mw is measured as 62,550, and the MWD (Mw/Mn) is measured as 2.72.

The visbroken, pelletized compositions were then converted into melt-blown webs on a Reicofil MG250 line using a spinneret having 460 holes of 0.4 mm exit diameter and 35 holes per inch. Throughput was 45 kg/h/m, the DCD (die to collector distance) was 200 mm, the melt temperature was 290° C. and the webs produced have a weight of 25 g/$m^2$.

The melt-blown webs thus obtained were the charged in an electric field directly after the collector. The generator used is KNH35/BNKO2 (produced and supplied by Eltex Elektrostatik GmbH) and operator at 20 kV, the electrode is R131A3A/0975 (produced and supplied by Eltex Elektrostatik GmbH).

FIG. 1 shows the filtration efficiency of the electret melt-blown webs thus obtained. CE1 represents the case wherein no charge-stabilizing agent has been used, and it can be clearly seen that the filtration efficiency decays over the measured 168 hour period. CE2 uses magnesium stearate, a known charge-stabilizing agent, whilst IE1 employs an inventive charge-stabilizing agent according to Formula (I). As can be seen from the filtration efficiency values on the graph, the use of the inventive charge stabilizing agent results in not only improve filtration efficiency directly after charging (1 hour), but also improved charge stabilization. The value measured for IE1 after 168 hours (87.09) is comparable the value measured after 1 hour (86.85), whereas for CE2, the value has decayed from 85.32 to 83.10 over the same period (a decrease of approx. 3%).

The quality factor (as measured after 168 hours) of CE1 was 1.94, whilst CE2 had a quality factor of 2.52 and IE1 had a quality factor of 2.79.

The invention claimed is:

1. A polypropylene composition (PC) comprising:

i) from 95.0 to 99.99 wt. %, based on the total weight of the composition, of a polypropylene (PP); and ii) from 0.01 to 5.0 wt. %, based on the total weight of the composition, of a compound according to Formula (I):

(I)

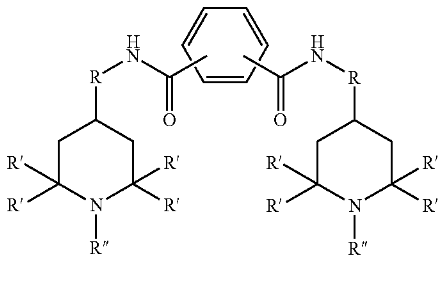

wherein each R is independently selected from $C_1$ to $C_6$ alkylene, $C_2$ to $C_6$ alkenylene and a single bond, each R' is independently selected from H and $C_1$ to $C_6$ alkyl, each R" is independently selected from H and $C_1$ to $C_{22}$ alkyl, wherein each alkylene, alkenylene and alkyl group may optionally be substituted by deuterium or fluorine, and the two substituents on the central benzene ring may be either positioned in an ortho, meta or para relationship;

wherein the individual contents of the polypropylene (PP) and the compound according to Formula (I) add up to at least 98.0 wt. %, based on the total weight of the composition, and wherein the polypropylene (PP) has a melt flow rate $MFR_2$, determined according to ISO 1133 at 230° C. at a load of 2.16 kg, in the range from 400 to 5000 g/10 min, a melting temperature Tm, determined by differential scanning calorimetry (DSC) according to ISO 11357, in the range from 140 to 170° C., and the polypropylene (PP) has been polymerized in the presence of a single site catalyst (SSC).

2. The polypropylene composition (PC) according to claim 1, wherein each R is independently selected from methylene and a single bond, each R' is independently selected from $C_1$ to $C_6$ alkyl, each R" is H and the two substituents on the central benzene ring are positioned in a meta relationship.

3. The polypropylene composition (PC) according to claim 1, wherein the polypropylene (PP) has a molecular weight distribution (Mw/Mn), determined by Gel Permeation Chromatography in the range from 1.0 to 6.0.

4. The polypropylene composition (PC) according to claim 1, wherein the polypropylene (PP) has a weight average molecular weight Mw, determined by Gel Permeation Chromatography, in the range from 25,000 to 85,000.

5. The polypropylene composition (PC) according to claim 1, wherein the polypropylene (PP) has a content of 2,1 erythro regiodefects, as determined by $^{13}$C-NMR spectroscopy, in the range from 0.01 to 1.5 mol % and/or a melting temperature Tm, determined by differential scanning calorimetry (DSC) according to ISO 11357, in the range from 151 to 160° C.

6. The polypropylene composition (PC) according to claim 1, wherein the polypropylene (PP) is the product of visbreaking a precursor polypropylene (PP2) using a visbreaking agent.

7. The polypropylene composition (PC) according to claim 6, wherein the visbreaking ratio is in the range from 3.0 to 40, calculated as the melt flow rate $MFR_2$ of the polypropylene (PP) divided by the melt flow rate $MFR_2$ of the precursor polypropylene (PP2) wherein each melt flow rate $MFR_2$ is determined according to ISO 1133 at 230° C. at a load of 2.16 kg.

8. The polypropylene composition (PC) according to claim 6, wherein the melt flow rate $MFR_2$, determined according to ISO 1133 at 230° C. at a load of 2.16 kg, of the precursor polypropylene (PP2) is in the range from 50 to 399 g/10 min.

9. The polypropylene composition (PC) according to claim 1, wherein the polypropylene (PP) is a propylene homopolymer (HPP).

10. Melt-blown webs made from the polypropylene composition (PC) according claim 1.

11. The melt-blown webs according to claim 10, which are electret melt-blown webs.

12. The melt-blown webs according to claim 11 having a filtration efficiency value determined according to EN 1822-3 using a test filter area of 400 $cm^2$measured 168 hours after charging of at least 98.0% of the value of the filtration efficiency measured 1 hour after charging.

13. A process for producing a melt-blown web according to claim 10 comprising the steps of:

(a.i) providing polypropylene (PP1) or (a.ii) providing polypropylene (PP2) and a visbreaking agent; and (b) providing the compound according to Formula (I);

(c) pelletizing a mixture of the components provided in steps (a) and (b) in a pelletizer to obtain the polypropylene composition (PC) comprising 95.0 to 99.9 wt. %, based on the total weight of the composition, of the polypropylene (PP) and 0.01 to 5.0 wt. %, based on the total weight of the composition, of the compound according to Formula (I); and (d) melt-blowing the blended pellets obtained in step (c).

14. The process according to claim 13, further comprising a step:

(e) electrostatically charging the melt-blown web obtained in step (d) to obtain an electret melt-blown web.

15. The process according to claim 14, wherein the melt-blown web has been electrostatically charged via electrostatic spinning, corona charging, tribocharging, hydrocharging or in an electrical field.

* * * * *